United States Patent Office 2,863,881
Patented Dec. 9, 1958

2,863,881

DIEPOXIDES

Benjamin Phillips and Paul S. Starcher, Charleston, W. Va., assignors to Union Carbide Corporation, a corporation of New York No Drawing. Original application January 5, 1954, Serial No. 402,396, now Patent No. 2,750,395, dated June 12, 1956. Divided and this application November 29, 1955, Serial No. 549,864

4 Claims. (Cl. 260—348)

This invention relates to a new class of organic compounds which are useful in the plastics and resins industry. More particularly, this invention relates to a new class of diepoxide compounds prepared from the cycloaliphatic esters of dicarboxylic acid compounds.

The compounds of this invention may be conveniently represented by the following general formula:

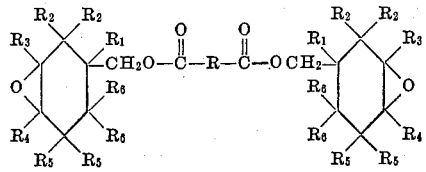

wherein $R_1$, $R_2$, $R_3$, $R_4$, $R_5$ and $R_6$ represent a hydrogen atom or an aliphatic hydrocarbon radical and R represents a divalent organic hydrocarbon radical containing from 0 to 10 carbon atoms.

The invention contemplates within its scope various compounds in which R has been derived from the dicarboxylic acids of the series, such as, for example, oxalic acid, in which case R would not contain any carbon atoms; and aliphatic dicarboxylic acids such as maleic acid and pimelic acid, in which case R would contain two (2) and five (5) carbon atoms respectively. Other compounds contemplated by this invention are those in which R has been derived from the dicarboxylic acids of the aromatic series, such as, for example, the phthalic acids including, of course, phthalic acid, isophthalic acid and terephthalic acid, in which case R would contain six (6) carbon atoms.

Thus, one phase of this invention is directed to compounds which may be represented by the structural formula:

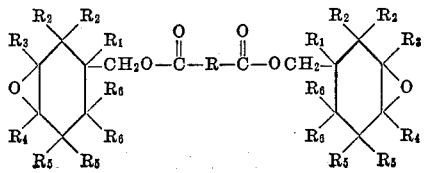

in which $R_1$, $R_2$, $R_3$, $R_4$, $R_5$ and $R_6$ represent a hydrogen atom or an alkyl radical and R represents a divalent aliphatic hydrocarbon radical. More particularly, R represents the hydrocarbon chain of dicarboxylic acids of the aliphatic series.

Another phase of this invention is directed to compounds having the general formula, as set forth above, but in which R now represents an arylene radical which is the hydrocarbon skeleton derived from dicarboxylic acids of the aromatic series.

The compounds of this invention are useful as modifiers for commercially important synthetic condensation resins and are particularly adapted for use as plasticizers and stabilizers for various synthetic organic resins, and in addition, are valuable in certain commercial applications, such as, for example, surface coatings, laminates and plastic molding compositions.

The compounds of this invention are produced by the epoxidation of the olefinic linkages contained in the starting materials, which are the bis-(3-cyclohexenyl-methyl) esters of dicarboxylic acids and may be prepared by either of two oxidation procedures, both of which are satisfactory and provide commercially acceptable yields.

The first oxidation method is called the acetaldehyde monoperacetate method, and the reaction whereby the epoxides are formed may be illustrated by the following general equation:

ACETALDEHYDE MONOPERACETATE METHOD

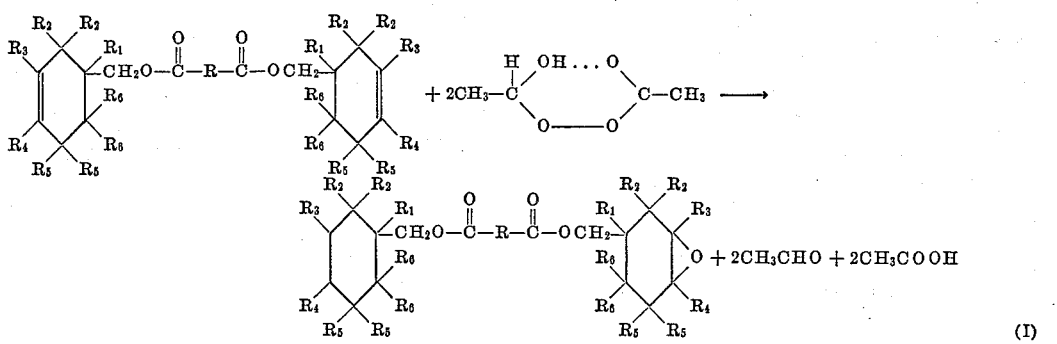

(I)

wherein $R_1$, $R_2$, $R_3$, $R_4$, $R_5$ and $R_6$ represent a hydrogen atom or an aliphatic hydrocarbon radical and R is as hereinbefore defined.

The second oxidation method is called the peracetic acid method, and the reaction whereby the epoxides are formed may be illustrated by the following equation:

PERACETIC ACID METHOD

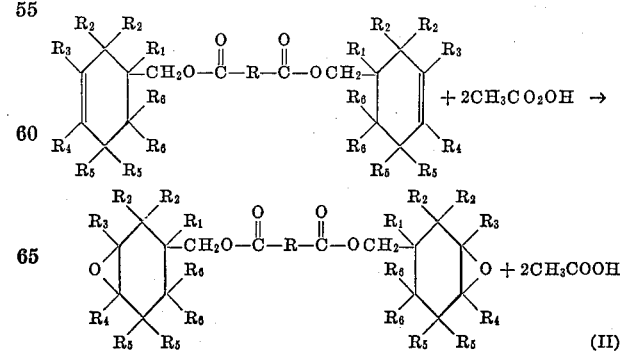

(II)

wherein $R_1$, $R_2$, $R_3$, $R_4$, $R_5$ and $R_6$ represent a hydrogen atom or an aliphatic hydrocarbon radical and R is as hereinbefore defined.

The use of peracetic acid as the oxidation agent is preferred since it is particularly well suited for the epoxidation reaction because the cyclohexenyl ring is relatively easily converted to the corresponding epoxy form. This particular ability of peracetic acid and other percarboxylic acids, in general, to promote easily controlled reactions and provide acceptable yields is unique in that they are able to effect several specific types of chemical transformations with acceptable efficiencies, while other powerful oxidizing reagents, such as potassium permanganate, are not.

One such type of chemical transformation that the percarboxylic acids are able to effect is that type of transformation which makes available the compounds of this invention, that is, the oxidation of the unsaturated organic compounds to produce the corresponding epoxides.

The starting materials used to produce the compounds of this invention, and more particularly the bis-(3-cyclohexenylmethyl) dicarboxylates may be prepared by the reaction of an unsaturated cycloaliphatic alcohol, such as, for example, 3-cyclohexenylmethanol and a dicarboxylic acid.

Illustratively, a 3-cyclohexenylmethanol and a dicarboxylic acid or the corresponding anhydride are mixed in a mol ratio of about two mols of alcohol per mol of acid and heated with a trace of sulphuric acid as an esterification catalyst to about 100° C. in an azeotrope-forming solvent, such as, toluene or benzene, to permit the continuous removal of the water formed during the reaction. The bis-(3-cyclohexenylmethyl) ester of the dicarboxylic acid can then be recovered from the reaction mixture as a distillation product.

The various unsaturated cycloaliphatic alcohols which are suitable for use in preparing the starting materials can be readily obtained in an intermediate stage by the reaction of butadiene or homologs of butadiene with alpha, beta-unsaturated aliphatic aldehydes, such as, for example, acrolein, methacrolein, crotonaldehyde and the like. The unsaturated cycloaliphatic aldehydes, thus produced, are then reduced to the corresponding alcohols by known procedures.

Listed below are several of the many combinations of reactants which may be employed in preparing the intermediate aldehydes for reduction to the unsaturated cycloaliphatic alcohols:

Acrolein and butadiene
Crotonaldehyde and butadiene
Methacrolein and butadiene
Acrolein and isoprene
Crotonaldehyde and isoprene
Methacrolein and isoprene
Acrolein and 1,3-pentadiene
Crotonaldehyde and pentadiene
Methacrolein and pentadiene
Acrolein and 2,3-dimethylbutadiene
Crotonaldehyde and dimethylbutadiene
Methacrolein and dimethylbutadiene Thus, the cyclohexenyl ring may have a variety of alkyl substituents depending on the choice of starting materials.

Various other alcohols, such as those reported in U. S. Patents 2,454,047 and 2,557,136; and Jour. Am. Chem. Soc. 64, 1497–1499 (1942) can be utilized satisfactorily.

The dibasic acids which are useful in preparing the bis-(3-cyclohexenylmethyl) dicarboxylates may be any suitable aliphatic dicarboxylic acid, such as, for example, oxalic acid, maleic acid, succinic acid, alkenyl substituted succinic acids, glutaric acid, adipic acid, pimelic acid, sebacic acid, and the like, or any suitable aromatic dicarboxylic acid, such as, for example, phthalic acid, isophthalic acid, terephthalic acid and the like.

The epoxidation reaction of this invention can be carried out by reacting a bis-(3-cyclohexenylmethyl) dicarboxylate with peracetic acid in an acetone solvent in a mol ratio of peracetic acid to a bis-(3-cyclohexenylmethyl) dicarboxylate of at least 2:1 and preferably greater than 2:1. The peracetic acid is added dropwise to the dicarboxylate, which is maintained at a temperature in the range of 25° C. to 50° C. After the addition of the peractic acid is complete, the reaction conditions are maintained for an additional period. Analysis of the solution for peracetic acid indicates whether or not the reaction is complete.

The products are recovered from the reaction solution by washing with water or, preferably, by distilling off all low-boiling materials at reduced pressure. An inert solvent having a boiling point above that of acetic acid is often used to aid in removal of the acetic acid under mild distillation conditions.

The following examples will serve to illustrate the practice of the invention:

*Example 1*

A. PREPARATION OF BIS-(3-CYCLOHEXENYLMETHYL) OXALATE

A solution of 194 grams (1.73 mols) of 3-cyclohexenylmethyl alcohol, 187 grams (2.37 mols) of pyridine, and 500 cc. of ethyl ether was placed in a flask fitted with a stirrer, dropping funnel, and reflux condenser. To the stirred contents of the flask were added, over a period of two hours, 100 grams (0.79 mol) of oxalyl chloride. Gentle refluxing occurred, and pyridine hydrochloride was precipitated during the addition. The reaction was allowed to proceed for one hour after the addition was complete, and then the reaction mixture was added to about 750 ml. of ice water. After mixing well, all the solid dissolved, and the water layer was separated off. The ether layer was extracted once more with 500 ml. of water, dried with sodium sulfate, and then distilled. There were obtained 175 grams of bis-(3-cyclohexenylmethyl) oxalate, boiling at 180° C. to 185° C. at 5 mm. of Hg pressure, which analyzed 99 percent pure by saponification and 99.3 percent pure by determination of double bonds. The yield was 80 percent of theory.

B. PREPARATION OF BIS(3,4-EPOXYCYCLOHEXYLMETHYL) OXALATE

One hundred seventy-four grams (0.626 mol) of bis-(3-cyclohexenylmethyl) oxalate, prepared from oxalyl chloride and 3-cyclohexenylmethyl alcohol, were placed in a one-liter flask and heated to 35° C. Then 518 grams of a 24.8 percent solution of peracetic acid in acetone (1.69 mols of peracetic acid) were added dropwise over a period of one and three-quarter hour to the stirred contents of the flask maintained at 35° C. to 40° C. by external cooling as required. The reaction conditions were maintained for an additional three and one-half hours, and the solution was stored overnight at −11° C.

The reaction solution was added dropwise to a still kettle containing ethylbenzene refluxing at 25 mm. of Hg pressure. During the addition, acetone, peracetic acid, acetic acid and ethylbenzene were distilled at the column head. After the addition was complete, the kettle was stripped of low-boiling material and there were obtained 190 grams of residue product which analyzed 70.4 percent as bis-(3,4-epoxycyclohexylmethyl) oxalate by determination of epoxide groups and 2.3 percent unreacted bis-(3-cyclohexenylmethyl) oxalate by determination of double bonds. The yield of diepoxide was 69 percent of theory. The residue product, $n_D^{30}$ 1.4927, $d_{15.6}^{25}$ 1.206, was a clear light yellow, viscous liquid which boiled at 180° C. at 22 mm. of Hg pressure with slight decomposition.

*Example 2*

A. PREPARATION OF BIS-(6-METHYL-3-CYCLOHEXENYLMETHYL) MALEATE

In a still kettle fitted with a 1⅜ in. x 22 in. packed column, were placed 200 grams (1.72 mols) of maleic anhydride, 500 grams of benzene, 3.4 grams of p-toluenesulfonic acid, and 1.7 grams of di-(beta-naphthyl)-p-phenylenediamine inhibitor. The kettle contents were refluxed and 476 grams (3.78 mols) of 6-methyl-3-cyclohexenylmethyl alcohol were added dropwise in twenty minutes. Refluxing was continued until 31 grams of water were collected as a lower layer in the still head. The kettle contents were then cooled, and the catalyst was neutralized with 30 grams of sodium acetate, and the mixture was filtered. The filtrate was distilled and there were obtained 388 grams of bis-(6-methyl-3-cyclohexenylmethyl) maleate, boiling at 180° C. to 190° C. at 1 mm. of Hg pressure or 200° C. at 2 mm. of Hg pressure, which analyzed 99.7 percent purity by saponification. The yield was 68 percent of theory.

B. PREPARATION OF BIS-(3,4-EPOXY-6-METHYL-CYCLOHEXYLMETHYL) MALEATE

Three hundred seventy-eight grams (1.14 mols) of bis-6-methyl-3-cyclohexenylmethyl) maleate, prepared from 6-methyl-3-cyclohexenylmethyl alcohol and maleic anhydride, were placed in a 2-liter flask and heated to 35° C. Then 1064 grams of a 20.4 percent solution of peracetic acid in acetone (2.85 mols of peracetic acid) were added dropwise to the stirred contents of the flask which was maintained at 35° C. by external cooling as required. The addition required one hour and thirty minutes and the reaction conditions were maintained for an additional five hours; then the solution was stored at −11° C. overnight.

The reaction solution was added dropwise to a still kettle containing ethylbenzene refluxing at 25 mm. of Hg pressure. During the addition, acetone, acetic acid, peracetic acid and ethylbenzene were distilled at the column head. After the addition, all low-boiling material was stripped off, and there were obtained as residue product 420 grams of light-colored, viscous liquid analyzing 85 percent as bis-(3,4-epoxy-6-methylcyclohexylmethyl) maleate, corresponding to a yield of 86 percent. The material distilled with slight decomposition at 210° C. to 220° C. at 1 mm. of Hg pressure. The filtered residue product was a clear light yellow viscous liquid, $n_D^{30}$ 1.5003, $d_{15}^{25}$ 1.51.

Example 3

A. PREPARATION OF BIS-(6-METHYL-3-CYCLOHEXENYLMETHYL) SUCCINATE

A mixture of 175 grams (1.75 mols) of succinic anhydride, 485 grams (3.85 mols) of 6-methyl-3-cyclohexenylmethyl alcohol, 500 grams toluene and 4.8 grams p-toluene-sulfonic acid was refluxed until 33 grams of water had separated as a lower layer in the still head. Then, after cooling, the catalyst was neutralized with 4.1 grams of sodium acetate. The solution was distilled and there were obtained 558 grams of bis-(6-methyl-3-cyclohexenylmethyl) succinate, boiling at 180° C. to 200° C. at 1–2 mm. of Hg pressure, which analyzed 98 percent purity by saponification and 100 percent purity by determination of double bonds. The yield was 95.5 percent of theory.

B. PREPARATION OF BIS-(3,4-EPOXY-6-METHYL-CYCLOHEXYLMETHYL) SUCCINATE

To a three-liter flask, there were charged 553 grams (1.65 mols) of bis-(6-methyl-3-cyclohexenylmethyl) succinate which were heated to 35° C. To the stirred contents of the flask, there were added dropwise, over a period of three and one-quarter hours, 1260 grams of a 24.8 percent solution of peracetic acid in acetone (4.12 mols of peracetic acid) while the temperature was maintained at 35° C. to 40° C. by external cooling as required. The reaction conditions were maintained for an additional three and one-half hours, and the reaction solution was stored overnight at −11° C. Analysis of the solution for peracetic acid at the end of this period showed that all of the peracetic acid had been consumed.

The reaction solution was added dropwise to a still kettle containing ethylbenzene refluxing at 25 mm. of Hg pressure. During the addition, acetic acid, acetone, peracetic acid and ethylbenzene were distilled at the head. After the addition was complete, all low-boiling material was stripped off, and there were obtained 611 grams of residue product analyzing 87.5 percent as bis-(3,4-epoxy-6-methylcyclohexylmethyl) succinate by determination of epoxide groups, 6.4 percent as unreacted bis-(6-methyl-3-cyclohexenylmethyl) succinate by determination of double bonds, and 0.2 percent acidity as acetic acid. This corresponds to a yield of 89 percent of diepoxide. The residue product, $n_D^{30}$ 1.4893, $d_{15.6}^{25}$ 1.143, was a light yellow viscous liquid which boiled with slight decomposition at 170° C. to 210° C. at 2 mm. of Hg pressure.

Example 4

A. PREPARATION OF BIS-(3-CYCLOHEXENYLMETHYL) PIMELATE

A mixture of 320 grams (2 mols) of pimelic acid, 560 grams (5 mols) of 3-cyclohexenylmethyl alcohol, 300 ml. of benzene, and 1 gram of sulfuric acid in a 2-liter kettle was refluxed for forty-eight hours and 65 grams of water were collected at a lower layer in the still head. The kettle contents were cooled and washed with 10 percent sodium carbonate and then with water and distilled, yielding 553 grams bis-(3-cyclohexenylmethyl) pimelate, boiling at 233° C. at 4.5 mm. of Hg pressure, $n_D^{31}$ 1.4850–1.4858, $$d_{20}^{20} 1.03\tfrac{5}{6}$$

analyzing 99.7 percent purity by saponification. The yield was 80 percent of theory.

| Analysis for $C_{21}H_{32}O_4$ | Found | Theory |
| --- | --- | --- |
| Percent Carbon | 72.4 | 72.23 |
| Percent Hydrogen | 9.2 | 9.19 |

B. PREPARATION OF BIS-(3,4-EPOXYCYCLOHEXYL-METHYL) PIMELATE

Five hundred and five grams of bis-(3-cyclohexenylmethyl) pimelate were placed in a 3-liter flask fitted with a stirrer, thermometer and dropping funel. There were added dropwise, with stirring over a three-hour period, 1250 grams of a 25.7 percent solution of peracetic acid in acetone. The reaction was exothermic and the reaction solution was maintained at 35° C., during the addition and for two more hours, by cooling with a water bath as required.

The reaction solution was fed dropwise to a still kettle containing ethylbenzene refluxing at 25 mm. of Hg pressure and during the addition, acetone, acetic acid, peracetic acid and ethylbenzene were distilled from the reaction mixture. After the addition was complete, the residue product was stripped of remaining ethylbenzene and there were obtained 556 grams of residue product, analyzing 87 percent as bis-(3,4-epoxycyclohexylmethyl) pimelate by analysis for epoxide groups and 8.3 percent as unreacted bis-(3-cyclohexenylmethyl) pimelate by analysis for unsaturation. The yield of diepoxide was 88 percent of theory.

Example 5

A. PREPARATION OF BIS-(3-CYCLOHEXENYLMETHYL) TEREPHTHALATE

A mixture of 406 grams (2.09 mols) of dimethyl terephthalate, 1174 grams (10.49 mols) of 3-cyclohexenylmethyl alcohol, and 15.0 grams (0.278 mol) of sodium methylate was heated at 150° C. for forty-five minutes in a still kettle fitted with 1⅜ in. x 24 in. packed column. During this period, 109 grams of methanol were removed as a distillate. This corresponds to 82 percent of the theoretical amount. The mixture in the kettle was then cooled, and the crystals were isolated by filtration, washed thoroughly with cold methanol, and dried. The crystalline material was purified by recrystallization from ethanol, and there were obtained 310 grams of purified bis-(3-cyclohexenylmethyl) terephthalate in the form of slightly yellow needles having a melting point of 100° C. to 101° C. and analyzing 100 percent purity by saponification. The yield of isolated ester was 42 percent of theory. Additional product may be obtained from the mother liquors.

B. PREPARATION OF BIS-(3,4-EPOXYCYCLOHEXYL-METHYL) TEREPHTHALATE

To a well-stirred suspension of 60 grams (0.17 mol) of bis-(3-cyclohexenylmethyl) terephthalate in 240 grams of butyl acetate at 40° C., there were added, over a period of thirty minutes, 366 grams of a 24.6 percent solution of peracetic acid in acetone (1.17 mols of peracetic acid). The solution was stirred and held at 40° C. for an additional hour, after which an analysis for peracetic acid showed that the theoretical amount had reacted. On cooling the reaction mixture, the product crystallized in the form of white needles, which were isolated by filtration. Two additional crops of crystals were obtained by evaporation of the mother liquor. The crystals, after being washed with acetone and dried, had a melting point of 128° C. to 130° C. and weighed 39 grams, corresponding to a 60 percent yield of bis-(3,4-epoxycyclohexylmethyl) terephthalate. The purity, determined by analysis for oxirane oxygen, was 96.6 percent. A small sample, recrystallized twice from ethyl acetate, had a melting point of 131.5° C. to 133° C. and a purity of 99.9 percent by analysis for oxirane oxygen.

This application is a division of application, Serial No. 402,396, filed January 5, 1954, now U. S. 2,750,395.

What is claimed is:

1. As a new compound, bis - (3,4 - epoxycyclohexylmethyl) oxalate.
2. As a new compound, bis - (3,4 - epoxycyclohexylmethyl) succinate.
3. Bis - (3,4 - epoxy - 6 - methylcyclohexylmethyl) sebacate.
4. Bis - (3,4 - epoxy - 6 - methylcyclohexylmethyl) adipate.

No references cited.